UNITED STATES PATENT OFFICE.

PRESTON B. ROSE, OF ANN ARBOR, MICHIGAN.

TANK-WASTE FERTILIZER.

SPECIFICATION forming part of Letters Patent No. 371,630, dated October 18, 1887.

Application filed January 15, 1887. Serial No. 224,416. (No specimens.)

*To all whom it may concern:*

Be it known that I, PRESTON B. ROSE, a citizen of the United States, residing at Ann Arbor, in the county of Washtenaw and State of Michigan, have invented a new and useful Improvement in Tank-Waste Fertilizers, which I desire to protect by Letters Patent of the United States, and of which the following is a specification.

In the rendering of lard, tallow, and other fats a considerable quantity of water is necessarily used in the rendering-tanks, and is known in the industry as "tank-water." This tank-water, although apparently limpid, contains about ten per cent. of solid matter. It has heretofore simply been an offensive element in the rendering of fats, and it has been disposed of almost universally by discharge through the sewers, or in the same manner as the other offensive surroundings of a rendering-establishment, and such water is the principal source of the offensive and deleterious odors which arise in the rendering of fats. This water is produced in enormous quantities in every large slaughtering-establishment, and as the solid matter which it contains in solution consists principally of an albuminoid substance of which about fifteen per cent. is nitrogen, it would, if the useful elements which it contains could be made available, have a great commercial value. Many efforts have been made to utilize this tank-water, or the "waste" which it contains, as a fertilizer; but the difficulty has been encountered that it has been found practically impossible to reduce the waste or solid matter to a permanently dry form, so that it will keep, it being found that however thorough the desiccating process to which it is subjected it will speedily accumulate moisture. As fertilizers frequently have to be transported to considerable distances and kept in storage for considerable lengths of time before being used, this difficulty has proved an insuperable obstacle to all attempts hitherto made to use tank-waste as a fertilizer.

It is the object of my present invention to devise a means for reducing tank-waste to a fixed and permanent form, and I have found that this can be done by causing the tank-water in a fluid or semi-fluid condition to be absorbed by vegetable material and then thoroughly drying the product. Among the vegetable materials which I have found, so far as my experiments have extended, specially adapted for the purpose are those of fibrous character having a cellulose or lignine structure—such, for instance, as hay, straw, sawdust, street-sweepings, the material taken from the paunches of slaughtered herbivorous animals, barn-yard manure, and other substances of a similar character.

I do not limit myself to the enumerated cellulose or lignine substances, as many others besides those which I have mentioned doubtless exist which would be of service.

In practice I ordinarily place the tank-water previously evaporated to the consistence of a thick sirup, (known to rendering-men as "stick,") with a proper proportion of vegetable material, in a proper receptacle. Mix the whole thoroughly and dry the mixture by direct heat or steam or other convenient method. The product so formed may be made into cakes, or pulverized, or kept in the simple granulated condition which it naturally takes. I find that in these forms, or either of them, the product retains all of its valuable properties for an indefinite period of time. As to the proportions in which the tank-water and vegetable material should be used in making fertilizer, I find that the proportions may be varied from a very small relative part of vegetable material—say one part in four or five—to equal parts of tank-waste and vegetable material. In the former proportion the absorptive properties of the vegetable material are nearly exhausted. I find that the best proportions to use are from two to four parts of tank-water reduced to the consistence of a thick sirup, as above stated, to two parts of vegetable material, and to these I may add one part of calcic phosphate, or equivalent material, such as is usually made an ingredient of fertilizers. The phosphate, however, is not an essential ingredient and may be omitted. I do not, however, confine myself to the exact proportions mentioned, giving them merely as a general guide to the preparation of the fertilizer, having in view both the economy and the quality of the product, and I wish it understood that I claim the product, broadly, and without reference to relative proportions of the ingredients used.

It is not necessary to partially evaporate the tank-water before mixing it with the vegetable material, that being merely a convenient method of procedure. The proportion of tank-water to the vegetable material will need to be varied, however, according to the percentage of solid matter which the water contains—that is, the extent to which it has been evaporated. I find, also, that a good result is obtained by reducing the tank-water residuum to dryness and mixing it in a granulated form with vegetable material, the latter having sufficient absorptive properties to keep the granulated residuum dry and preserve it. I therefore include this modification of the above-described process as a part of my invention.

What I claim as new, and desire to protect by Letters Patent, is—

1. The fertilizer herein described, consisting of tank-waste reduced to a thoroughly-dry condition in intimate contact with a cellulose or lignine vegetable material, also thoroughly dried.

2. The fertilizer herein described in dry form, consisting of tank-waste incorporated with a cellulose or lignine vegetable material.

3. The fertilizer herein described, consisting of tank-waste reduced to a thoroughly-dry condition incorporated with the paunch material taken from slaughtered animals, substantially as set forth.

4. The fertilizer herein described, consisting of tank-waste incorporated with a cellulose or lignine vegetable material, together with a phosphate, all in about the proportions herein set forth, and reduced to a state of dryness.

PRESTON B. ROSE.

Witnesses:
FREDERICK C. GOODWIN,
E. L. HUBER.